G. W. BEADLE.
MACHINE FOR MANUFACTURING PARTS OF INCANDESCENT LAMPS.
APPLICATION FILED MAY 16, 1910.

1,017,072.

Patented Feb. 13, 1912.

2 SHEETS—SHEET 1.

WITNESSES:
C. L. Belcher
Otto S. Schairer

INVENTOR
George W. Beadle
BY
Wesley G. Carr
ATTORNEY

G. W. BEADLE.
MACHINE FOR MANUFACTURING PARTS OF INCANDESCENT LAMPS.
APPLICATION FILED MAY 16, 1910.

1,017,072.

Patented Feb. 13, 1912.

2 SHEETS—SHEET 2.

WITNESSES:
C. L. Belcher
Otto S. Schairer

INVENTOR
George W. Beadle
BY
Hurley Glean
ATTORNEY

UNITED STATES PATENT OFFICE.

GEORGE W. BEADLE, OF EAST ORANGE, NEW JERSEY, ASSIGNOR TO WESTINGHOUSE LAMP COMPANY, A CORPORATION OF PENNSYLVANIA.

MACHINE FOR MANUFACTURING PARTS OF INCANDESCENT LAMPS.

1,017,072. Specification of Letters Patent. Patented Feb. 13, 1912.

Application filed May 16, 1910. Serial No. 561,697.

*To all whom it may concern:*

Be it known that I, GEORGE W. BEADLE, a citizen of the United States, and a resident of East Orange, in the county of Essex and State of New Jersey, have invented a new and useful Improvement in Machines for Manufacturing Parts of Incandescent Lamps, of which the following is a specification.

My invention relates to machines that are used in the manufacture of electric incandescent lamps, and particularly to machines for inserting filament supports or anchors into the glass arbors of lamps.

The object of my invention is to provide a machine of the character indicated by means of which a plurality of filament supports or anchors may be simultaneously and expeditiously inserted into a glass arbor.

Figure 1:
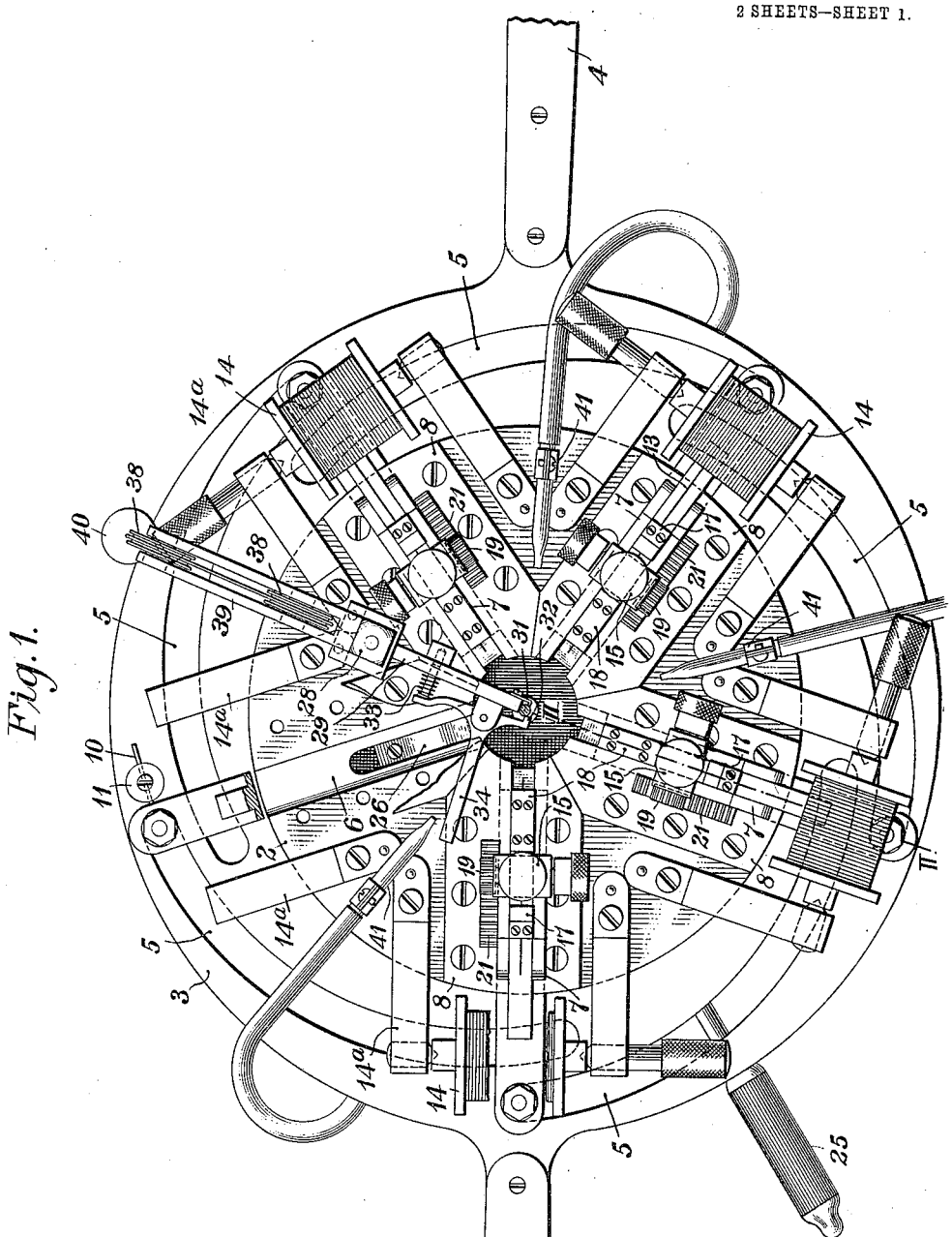
Figure 2:
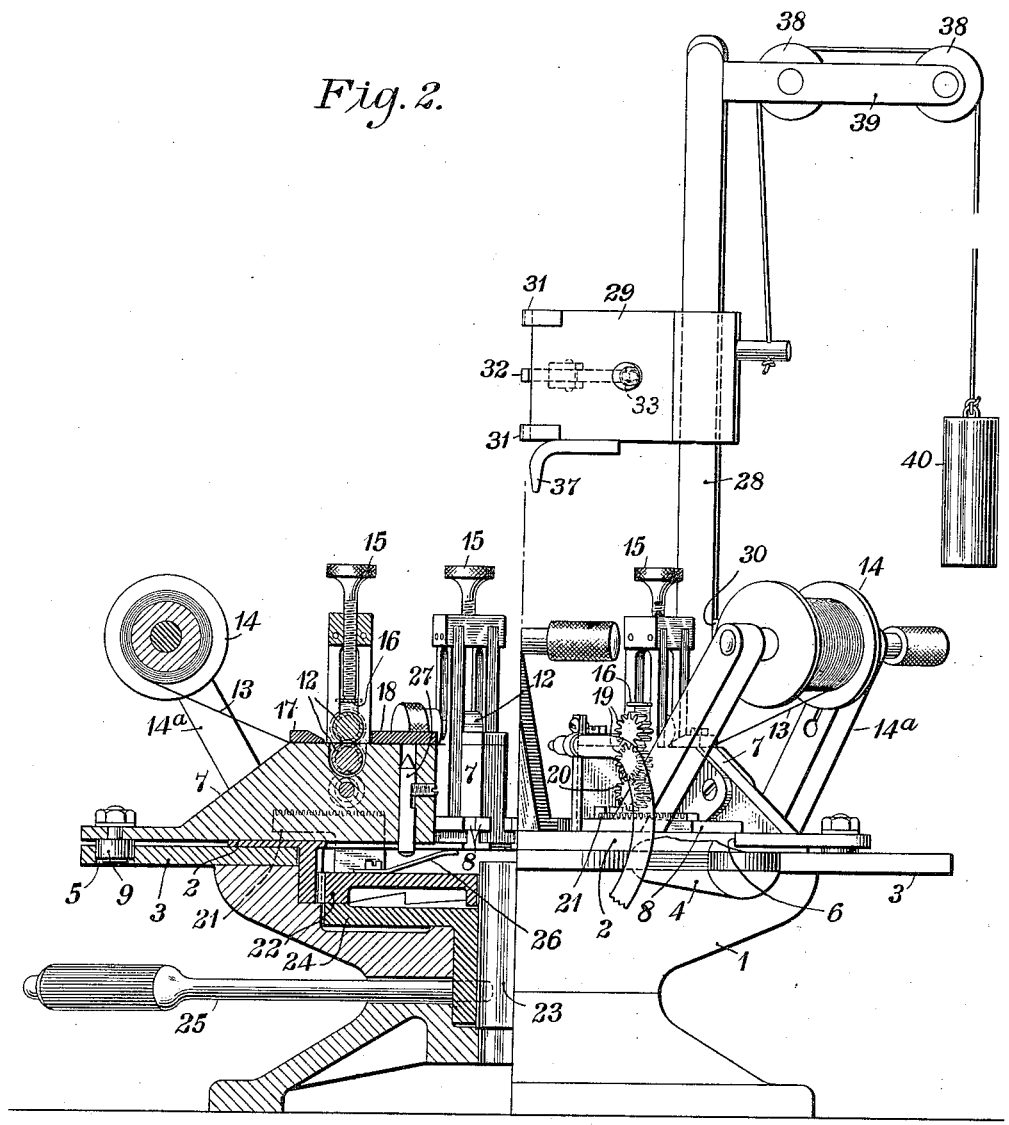

Figure 1 of the accompanying drawings is a plan view of a machine embodying the present invention, and Fig. 2 is a view, in section and in elevation, of the machine upon the line II—II of Fig. 1.

The machine comprises a rotatably mounted base 1 between which and a top plate 2 is an annular plate 3 having handles 4 for effecting its rotation, and slightly overlapping cam slots 5, near its outer periphery. The plate 2 is provided with a plurality of radial guide slots or recesses 6 for a corresponding number of carriages 7 that are secured therein so as to be capable of reciprocation by means of plates 8. The carriages 7 are provided, near their outer ends and upon their lower faces, with rollers 9 that project into the cam slots 5 in the annular plate 3, the rotation of the plate 3 thus effecting simultaneous and similar radial reciprocation of all of the carriages 7. The outer limit of travel of the carriages 7 may be adjusted by means of a pin 10 that is adjustably secured in a post 11 near one end of one of the cam slots 5, the said pin being adapted to engage the side of one of the carriages and to thereby prevent further rotation of the plate 3.

Mounted in each of the carriages 7 is a pair of engaging feed rolls 12 by means of which wires 13 are drawn from reels 14 that are stationarily mounted in posts 14ª carried by the plate 2, such pressures being applied to the feed rolls, by means of thumb-screws 15 and resilient plates 16, that, as the carriages are moved inwardly, the rolls will clamp the wires and draw them from the reels. The wires 13 are led to and from the feed rolls 12 by means of grooved guides 17 and 18 that are mounted upon the carriages upon opposite sides of the said rolls. The rolls 12 are operatively connected together, at their outer ends, by means of pinions 19, and are actuated by pinions 20 that are adapted to engage racks 21. The racks 21 are located in radial slots in the top plate 2 and in the plates 8, and they are carried by a member 22 that is mounted upon a post 23 within the base 1, and is capable of slight vertical movement thereon. The lower face of the member 22 is provided with a series of inclined surfaces corresponding to and engaging a series of similar surfaces upon a member 24 that is adapted to be rotated by means of a handle 25. As the handle 25 is revolved, the member 24 is rotated with respect to the member 22, and, by reason of the inclination of the engaging surfaces of the said members, the member 22 is raised or lowered, carrying with it the racks 21. As the racks 21 are raised and lowered, they are moved into and out of engagement with the pinions 20 upon the carriages 7. The member 22 also carries a set of springs 26, the outer ends of which are secured to the said member and the inner ends of which are inclined upwardly and project through slots in the top plate 2 directly beneath the inner ends of the carriages 7. The springs 26 are adapted, when the member 22 is raised, to engage the lower ends of knives 27 that are arranged for vertical reciprocation in the inner ends of the carriages 7, the upper ends of the knives being sharpened and adapted to engage and sever the wires when pressed upwardly with sufficient force by the springs.

Mounted upon the top plate 2 is a post 28 that carries a vertically reciprocable workholder or clamp 29 the lower limit of travel of which is determined by a stop 30 that is secured to the post 28. The work-holder comprises a plate having jaws 31 rigidly secured thereto, and an intermediate jaw 32 that is pivotally mounted thereon and is normally pressed into engagement with the work by means of a spring 33, an operating handle 34 being provided for the jaw 32. It will be understood, of course, that the work, in this instance, consists of the glass arbor of an incandescent lamp, which arbor is provided with beads or enlargements where the filament supports or anchors are to be inserted. Upon the bottom face of the work-holder 29 is a downwardly projecting arm 37 for indicating the correct position of the lamp arbor in the work-holder. The work-holder is attached to a cord that passes over pulleys 38 carried by an arm 39 at the upper end of the post 28, the other end of the cord being attached to a weight 40 of such size that the work-holder is substantially balanced and will remain in any position in which it may be placed. In order that the beads upon the lamp arbor may be softened sufficiently to permit of inserting the anchor wires therein, heat is applied thereto by means of a plurality of gas burners 41 that are located in convenient locations with respect to the other parts of the machine.

In the operation of the machine, a lamp arbor is inserted in the work-holder, which is then lowered so that the bead upon the arbor is in line with the gas burners and with the wire guides 18 upon the carriages 7. The handle 25 should then be moved in a clockwise direction, so that the racks 21 will not engage the pinions 20, and, if desired, this movement of the handle may also simultaneously effect opening of the valves governing the supply of compressed air or gas to the burners. When thus arranged, the arbor is not heated until everything is in readiness and the handle 25 has been moved to cause disengagement of the racks 21 with the pinions 20. When the lamp arbor is sufficiently heated, the plate 3 in rotated, so as to cause inward movement of the carriages 7, from the inner ends of which the extremities of the anchor wires 13 project, the ends of the said wires being thus inserted in the heated portion of the lamp arbor. Upon the completion of the inward stroke of the carriages, the handle 25 is moved in a counter-clockwise direction, in order to raise the springs 26 and cause the knives 27 to sever the wires 13, to raise the racks 21 into engagement with the pinions 20, and, if the air or gas supply is governed thereby, to limit the same. The plate 3 is then rotated, so as to cause the carriages 7 to again move outwardly, during which movement the feed rolls 12 are rotated by the pinions 20 and racks 21 in such a direction as to cause an inward feeding of the anchor wires 13. Upon completion of the outward stroke of the carriages 7 (the arbor, with the anchor wires inserted, is removed from the work-holder, and the machine is again in condition for the reception of another arbor.

I claim as my invention:

1. A machine of the character described comprising a reciprocable carriage, means for feeding wire longitudinally therethrough, means mounted in the carriage for severing the wire, and means for governing the operation of the said feeding and severing means.

2. A machine of the character described comprising a reciprocable carriage, and feed rolls and a knife mounted in the carriage.

3. A machine of the character described comprising a reciprocable carriage, means for feeding wire longitudinally therethrough, and means mounted in the carriage for severing the wire.

4. A machine of the character described comprising a reciprocable carriage, means for actuating the same, feed rolls and a knife mounted in the carriage, and means for governing the operation of the feed rolls and knife.

5. A machine of the character described comprising a reciprocable carriage, means for actuating the same, feed rolls mounted in the carriage, means for actuating the feed rolls upon reciprocation of the carriage, and means for governing the said actuating means.

6. A machine of the character described comprising a reciprocable carriage, means for actuating the same, feed rolls and a knife mounted in the carriage, a pinion for actuating the feed rolls, a rack, and means for actuating the knife and causing engagement and disengagement of the rack and pinion.

7. A machine of the character described comprising a reciprocable carriage, feed rolls mounted in the carriage, an operating pinion for the feed rolls, a rack adapted to engage the pinion, and means for causing engagement and disengagement of the rack and pinion.

8. A machine of the character described comprising a plurality of radially reciprocable carriages, a wire feeding and a wire severing device mounted in each of the carriages, means for effecting reciprocation of the carriages, and means for actuating the feeding and severing devices during the reciprocation of the carriages.

9. A machine of the character described, comprising a plurality of radially reciprocable carriages, a wire feeding and a wire severing device mounted in each of the carriages, means for reciprocating the carriages, means for actuating the severing devices upon completion of the inward stroke of the carriages, and means for actuating the feeding devices during the outward stroke of the carriages.

10. A machine of the character described, comprising a reciprocable carriage, a work support that is movable to place the work in front of the movable carriage or to remove it therefrom, a wire feeding and a wire severing device mounted in the carriage, means for effecting reciprocation of the carriage, and means for actuating the wire feeding and severing devices during the reciprocation of the carriages.

11. A machine of the character described, comprising a plurality of radially reciprocable carriages, a work holder that is movable to place the work in front of the carriages and centrally with respect thereto or to remove it from such position, wire feeding and wire severing devices mounted in the carriages, means for effecting reciprocation of the carriages, and means for actuating the wire feeding and severing devices upon reciprocation of the carriages.

In testimony whereof, I have hereunto subscribed my name this 28th day of April, 1910.

GEORGE W. BEADLE.

Witnesses:
R. C. KARCHNER,
OTTO S. SCHAIRER.

---

Copies of this patent may be obtained for five cents each, by addressing the "Commissioner of Patents, Washington, D. C."